Figures 1, 2:
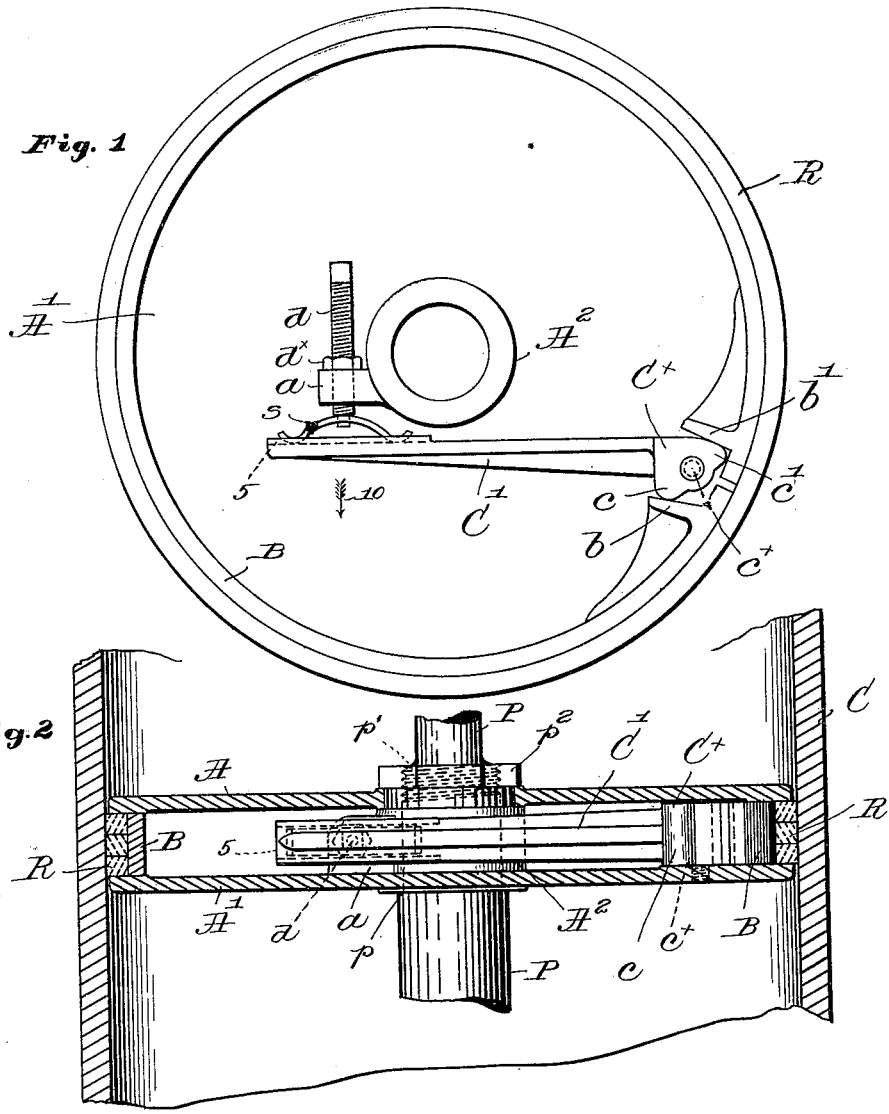

No. 650,750. Patented May 29, 1900.
C. D. CORSER.
PACKING FOR PISTONS.
(Application filed Mar. 12, 1900.)

(No Model.)

Witnesses,
Fred S. Greenleaf
W. C. Lunsford

Inventor.
Charles D. Corser,
by Crosby & Gregory.
attys.

UNITED STATES PATENT OFFICE.

CHARLES D. CORSER, OF HOLYOKE, MASSACHUSETTS, ASSIGNOR TO THE HOLYOKE MACHINE COMPANY, OF SAME PLACE.

PACKING FOR PISTONS.

SPECIFICATION forming part of Letters Patent No. 650,750, dated May 29, 1900.

Application filed March 12, 1900. Serial No. 8,300. (No model.)

*To all whom it may concern:*

Be it known that I, CHARLES D. CORSER, a citizen of the United States, and a resident of Holyoke, county of Hampden, State of Massachusetts, have invented an Improvement in Packing for Pistons, of which the following description, in connection with the accompanying drawings, is a specification, like letters and figures on the drawings representing like parts.

This invention relates to pistons for the cylinders of pulp-grinders or other engines; and it has for its object the production of simple and effective means for tightening or regulating the pressure of the packing of the piston.

Figure 1 is a top or plan view of a piston embodying my present invention with the upper disk-like head of the piston removed; and Fig. 2 is a partly-sectional view through the piston, the heads thereof and the packing-rings being shown in section, as is also a portion of the cylinder-wall.

I have herein shown the piston as comprising two metal disk-like heads A A', the latter being provided with a hub $A^2$ to receive the piston-rod P, Fig. 2, and support the head A, the piston-rod being shouldered, as at $p$, and threaded at $p'$ to receive a nut $p^2$, by which the heads are retained on the piston-rod. A packing-ring or a series of rings R of any suitable construction is interposed between the heads, at the periphery thereof, to project beyond the same and engage the walls of the cylinder C, Fig. 2. Inside the packing I interpose an expanding device, shown as a split ring B, bearing against the inner circumference of and supporting the packing and substantially equal in width to the distance between the piston-heads to thoroughly back up the packing, said ring having near its ends inturned abutments $b\ b'$ to be engaged by a controlling-cam $C^\times$, fulcrumed at $c^\times$ on the head A', near its circumference, and provided with high portions $c\ c'$, coöperating, respectively, with the abutments $b\ b'$.

The hub $A^2$ is shown as provided with a lateral ear $a$, having a threaded hole therein to receive a screw-stud $d$, one end of which is shown as bearing against a bow-spring $s$, mounted in a longitudinal recess 5 in an arm C', secured to or forming a part of the cam $C^\times$, the long arm giving a powerful leverage. A check-nut $d^\times$ may be employed, if desired, to lock the stud $d$ in adjusted position. By rotating the stud $d$ to swing the arm C' in the direction of arrow 10, Fig. 1, the controlling-cam will be turned to separate the ends of the expander B, enlarging its diameter and forcing the packing R outward to the desired extent, the spring $s$ providing a certain slight yield or elasticity for the pressure exerted on the packing.

It is necessary in the construction shown to remove the head A when the pressure is to be adjusted; but this is readily effected.

The means for tightening the packing is simple, very strong and durable, and effective.

Having fully described my invention, what I claim, and desire to secure by Letters Patent, is—

1. A piston having separated, disk-like heads one of which is provided with a central hub, to support the other head, annular packing interposed between the heads at their periphery, an annular expander between the heads and bearing against the inner circumference of the packing, a controlling-cam for the expander, fulcrumed on one of the heads and having a rigidly-connected lever-arm, and means carried by the hub to act upon the arm and adjust the angular position of the cam.

2. A piston having separated, disk-like heads one of which is provided with a central hub, having a threaded ear, annular packing interposed between said heads at their periphery, an annular expander to bear against the inner circumference of the packing and provided at its ends with abutments, a controlling-cam fulcrumed on one of the heads between and to act on said abutments, said cam having an attached lever-arm, and a screw-stud mounted in the ear and adapted to coöperate with the free end of said arm, to effect the rotative movement of the cam.

3. A piston having separated, disk-like heads one of which is provided with a central hub having a threaded ear, annular packing interposed between said heads at their periphery, an annular expander to bear against the inner circumference of the packing and provided at its ends with abutments, a controlling-cam fulcrumed on one of the heads between and to act on said abutments, said cam having an attached lever-arm, a spring on the lever-arm, and a screw-stud mounted in the threaded ear and adapted to engage the spring, to operate the cam and provide for a yielding outward pressure on the packing.

4. A piston having separated, disk-like heads one of which is provided with a central hub, to support the other head, annular packing interposed between the heads at their periphery, an annular expander between the heads and bearing against the inner circumference of the packing, a cam to expand the said ring, fulcrumed on one of the heads and having a radial arm, and means mounted on the hub to yieldingly act upon the arm and determine the angularity of the cam, to thereby adjust the pressure of the ring on the packing.

In testimony whereof I have signed my name to this specification in the presence of two subscribing witnesses.

CHARLES D. CORSER.

Witnesses:
 CHARLES A. CHASE,
 GEORGE S. PERRY.